(12) United States Patent
Gray et al.

(10) Patent No.: US 10,436,584 B2
(45) Date of Patent: Oct. 8, 2019

(54) LEVEL WITH AUDIO AND/OR VISUAL INDICATORS

(71) Applicant: Milwaukee Electric Tool Corporation, Brookfield, WI (US)

(72) Inventors: Richard Edward Gray, Delafield, WI (US); Scott Terrell Moeller, Richfield, WI (US); Gareth James Mueckl, Milwaukee, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 125 days.

(21) Appl. No.: 15/585,835

(22) Filed: May 3, 2017

(65) Prior Publication Data

US 2017/0322026 A1    Nov. 9, 2017

Related U.S. Application Data

(60) Provisional application No. 62/332,812, filed on May 6, 2016.

(51) Int. Cl.
| | | |
|---|---|---|
| *G01C 9/26* | (2006.01) | |
| *G08B 7/06* | (2006.01) | |
| *G01C 9/06* | (2006.01) | |

(52) U.S. Cl.
CPC ......... *G01C 9/26* (2013.01); *G01C 2009/066* (2013.01); *G08B 7/06* (2013.01)

(58) Field of Classification Search
CPC ....... G01C 9/26; G01C 2009/066; G08B 7/06
USPC .... 33/347, 365, 366.27, 371, 374, 379, 381, 33/385, 451, 452
See application file for complete search history.

(56) References Cited

U.S. PATENT DOCUMENTS

| | | | | |
|---|---|---|---|---|
| 1,563,321 A | * | 12/1925 | Bedortha | G01C 9/32 33/348 |
| 2,338,811 A | * | 1/1944 | Hasbrook | G01C 9/18 33/366.22 |
| 3,172,212 A | | 3/1965 | Densch | |
| 3,461,568 A | * | 8/1969 | Kawada | G01C 19/38 33/324 |
| 3,861,052 A | | 1/1975 | Siegfried | |
| 4,152,839 A | * | 5/1979 | McDonald | G01C 9/06 33/366.12 |
| 4,182,046 A | | 1/1980 | Ludlow | |
| 4,434,561 A | | 3/1984 | Gaspar | |
| 4,484,393 A | * | 11/1984 | LaFreniere | G01C 9/32 33/348.2 |

(Continued)

FOREIGN PATENT DOCUMENTS

| | | |
|---|---|---|
| CN | 2816750 Y | 9/2006 |
| EP | 1528359 A1 | 5/2005 |

(Continued)

*Primary Examiner* — Justin Seo
*Assistant Examiner* — Tania C Courson
(74) *Attorney, Agent, or Firm* — Reinhart Boerner Van Deuren s.c.

(57) ABSTRACT

A tool, such as a level, including audio and/or visual indicators is provided. The level may include one or more bubble level vials having a controller and a sensor. The visual indicators are associated with the vials. The controller is configured to activate the audio and visual indicators in repose to a signal received from the sensor. The controller illuminates the visual indicators for each vial when that vial indicates it is level or plumb.

19 Claims, 3 Drawing Sheets

(56) References Cited

U.S. PATENT DOCUMENTS

| | | | | |
|---|---|---|---|---|
| 4,506,450 A * | 3/1985 | Fleming | | G01C 9/06 33/348 |
| 4,574,491 A | 3/1986 | Vining | | |
| 4,590,680 A | 5/1986 | Hanchett et al. | | |
| 4,603,484 A * | 8/1986 | Strothmann | | G01C 9/06 33/366.22 |
| 4,625,423 A | 12/1986 | Hanger | | |
| 4,685,218 A | 8/1987 | Wolf | | |
| 4,712,093 A | 12/1987 | Reichel et al. | | |
| 4,716,534 A * | 12/1987 | Baucom | | G01C 9/12 250/208.6 |
| 4,720,920 A | 1/1988 | Tudek | | |
| RE32,962 E * | 6/1989 | Tudek | | G01C 9/06 33/348 |
| 4,932,132 A | 6/1990 | Baker et al. | | |
| 5,027,522 A | 7/1991 | Cagan et al. | | |
| 5,272,816 A * | 12/1993 | Fujiwara | | G01C 9/24 33/379 |
| 5,293,221 A | 3/1994 | Kitajima et al. | | |
| 5,313,713 A | 5/1994 | Heger et al. | | |
| 5,457,890 A | 10/1995 | Mooty | | |
| 5,592,745 A * | 1/1997 | Heger | | G01C 9/06 33/343 |
| 5,693,881 A | 12/1997 | Sitachitt et al. | | |
| 5,836,081 A | 11/1998 | Schroeder | | |
| 6,037,874 A | 3/2000 | Heironimus | | |
| 6,058,617 A | 5/2000 | Nadu | | |
| 6,115,928 A * | 9/2000 | Dauerer | | G01C 9/32 33/348 |
| 6,140,811 A | 10/2000 | Little | | |
| 6,249,113 B1 * | 6/2001 | Krantz | | G01V 3/15 324/67 |
| 6,343,422 B1 * | 2/2002 | Takahashi | | G01C 9/06 33/366.16 |
| 6,493,954 B1 | 12/2002 | Krantz | | |
| 6,606,798 B2 | 8/2003 | El-Katcha et al. | | |
| 6,694,631 B2 | 2/2004 | Bone et al. | | |
| 6,836,972 B2 * | 1/2005 | Drahos | | G01C 9/06 33/366.11 |
| 7,027,480 B2 | 4/2006 | Marshall et al. | | |
| 7,061,387 B2 | 6/2006 | Laun | | |
| 7,237,341 B2 | 7/2007 | Murray | | |
| 7,322,118 B2 * | 1/2008 | Huang | | G01C 9/06 33/366.23 |
| 7,350,305 B2 | 4/2008 | Molitorisz | | |
| 7,370,429 B2 | 5/2008 | Hall | | |
| 7,412,774 B2 | 8/2008 | Lu et al. | | |
| 7,530,175 B2 | 5/2009 | Strutt et al. | | |
| 7,564,020 B2 | 7/2009 | Sergyeyenko | | |
| 7,743,520 B1 | 6/2010 | Jiorle | | |
| 7,752,764 B2 | 7/2010 | Silvers | | |
| 7,975,393 B2 | 7/2011 | Sparrow | | |
| 8,006,397 B2 | 8/2011 | Schubert | | |
| 8,327,552 B2 * | 12/2012 | Scheyer | | G01C 9/32 33/348 |
| 8,553,213 B2 | 10/2013 | Fishel | | |
| 8,826,552 B2 | 9/2014 | Nishita | | |
| 8,881,412 B2 | 11/2014 | Nishita | | |
| 9,057,608 B2 | 6/2015 | Fan et al. | | |
| 9,885,570 B2 * | 2/2018 | Zhuang | | G01C 9/06 |
| 10,001,371 B2 * | 6/2018 | Neitzell | | G01C 9/36 |
| 10,088,306 B1 * | 10/2018 | Smith | | G01C 9/06 |
| 2002/0170190 A1 | 11/2002 | Wetterlind | | |
| 2002/0189116 A1 * | 12/2002 | Yang | | G01C 9/32 33/366.23 |
| 2003/0005592 A1 * | 1/2003 | Wang | | G01C 9/32 33/451 |
| 2004/0194329 A1 * | 10/2004 | Drahos | | G01C 9/06 33/366.11 |
| 2005/0210691 A1 | 9/2005 | Solak | | |
| 2006/0064888 A1 | 3/2006 | Chen | | |
| 2011/0271537 A1 * | 11/2011 | Scheyer | | G01C 9/32 33/379 |
| 2014/0101950 A1 | 4/2014 | Zhuang | | |
| 2014/0352161 A1 | 12/2014 | Ranieri et al. | | |
| 2015/0176188 A1 | 6/2015 | Bae | | |
| 2015/0308822 A1 * | 10/2015 | Meadows | | G01C 9/32 33/381 |
| 2016/0138916 A1 | 5/2016 | Neitzell et al. | | |

FOREIGN PATENT DOCUMENTS

| | | |
|---|---|---|
| EP | 1659362 B1 | 7/2008 |
| WO | WO/1993018370 | 9/1993 |
| WO | WO/2008060943 | 5/2008 |
| WO | WO/2010108720 | 9/2010 |
| WO | WO/2010108721 | 9/2010 |
| WO | WO/2012106977 | 8/2012 |

* cited by examiner

LEVEL WITH AUDIO AND/OR VISUAL INDICATORS

CROSS-REFERENCE TO RELATED PATENT APPLICATION

The present application claims the benefit of and priority to U.S. Provisional Application No. 62/332,812, filed on May 6, 2016, which is incorporated herein by reference in its entirety.

BACKGROUND OF THE INVENTION

The present invention relates generally to the field of tools. The present invention relates specifically to a tool, such as a level, a spirit level, a box-level, an I-beam level, a billet torpedo type level, a block torpedo type level, etc., with audio and/or visual indicators to indicate when the level tool is level relative to a specific plane such as a vertical plane (i.e. plumb) or a horizontal plane (i.e. level).

SUMMARY OF THE INVENTION

One embodiment of the disclosure relates to a leveling tool including a level body and a level vial supported by the level body. The leveling tool includes a light source supported by the level body and positioned to direct light toward the level vial. The leveling tool includes an electronic position sensor supported by the level body generating a signal indicative of the orientation of the level body. The leveling tool includes a controller supported by the level body and communicably coupled to the light source and the electronic position sensor. The controller is configured to control an aspect of light generated by the light source to illuminate the level vial in response to the signal received from the electronic position sensor.

Another embodiment of the disclosure relates to a leveling tool including a level body and a level vial supported by the level body. The level vial includes a first end, a second end and a longitudinal axis extending between the first end and the second end. The leveling tool includes a first light source supported by the level body and positioned to direct light toward the first end of the level vial in a direction along the longitudinal axis of the level vial. The leveling tool includes a second light source supported by the level body and positioned to direct light toward the second end of the level vial in a direction along the longitudinal axis of the level vial. The first and second light sources are configured to generate light having a first color when the level vial indicates levelness and to generate light of a second color when the level vial is not indicating levelness.

Another embodiment of the disclosure relates to a leveling tool including a level body and a level vial supported by the level body. The leveling tool includes a speaker supported by the level body and an electronic position sensor supported by the level body generating a signal indicative to the orientation of the level body. The leveling tool includes a controller supported by the level body and communicably coupled to the speaker and the electronic position sensor. The controller is configured to variably control an aspect of sound generated by the speaker in response to the signal received from the electronic position sensor.

Another embodiment of the disclosure relates to a level having a level body supporting a level vial. The level includes a first light source supported by the level body and positioned to direct light toward the level vial. The first light source has a first color. The level includes a second light source supported by the level body and positioned to direct light toward the level vial. The second light source has a second color different from the first color. The level includes an electronic position sensor generating a level signal and a not-level signal. The electronic position sensor is calibrated such that the electronic position sensor generates the level signal when the level vial indicates level. The level includes a controller supported by the level body and communicably coupled to the first light source, the second light source and the electronic position sensor. The controller is configured to control the first light source to illuminate the level vial in response to the not-level signal received from the electronic position sensor and to control the second light source to illuminate the level vial in response to the level signal received from the electronic position sensor.

Another embodiment of the disclosure relates to a level including a housing, plumb and level measures having vials and visual indicators, an audio indicator and internal electronics including a level/plumb sensor and a controller. In specific embodiments, the controller selectively illuminates the visual indicators associated with the plumb and level measures based on a signal received by the level/plumb sensor indicating whether the level is vertical or horizontal. In specific embodiments, the controller dynamically adjusts the visual indicators to vary the brightness and/or pulse rate in response to a signal received by the level/plumb sensor indicating the degree to which the level is vertical or horizontal. In specific embodiments, the controller activates the audio indicator to produce a tone in response to a signal received by the level/plumb sensor indicating whether the level is vertical or horizontal. In specific embodiments, the controller varies the volume, pitch, and/or pulse rate of a tone produced by a signal received by the level/plumb sensor indicating the degree to which the level is vertical or horizontal.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a level tool are shown. In general, the levels discussed herein include audio and/or visual indicators. The audio and visual indicators are electronically triggered to indicate when the level is positioned at a specific angle such as vertical (i.e. plumb) or horizontal (i.e. level). The audio and/or visual indicators of the level embodiments discussed herein assist users in measuring levelness by clearly indicating when a specific state, such as level or plumb, has been reached. In some embodiments, the level includes light sources positioned to brightly illuminate the level vial, and in some such embodiments, the light sources are controlled based on a levelness signal received from an electronic position sensor.

Figure 1:
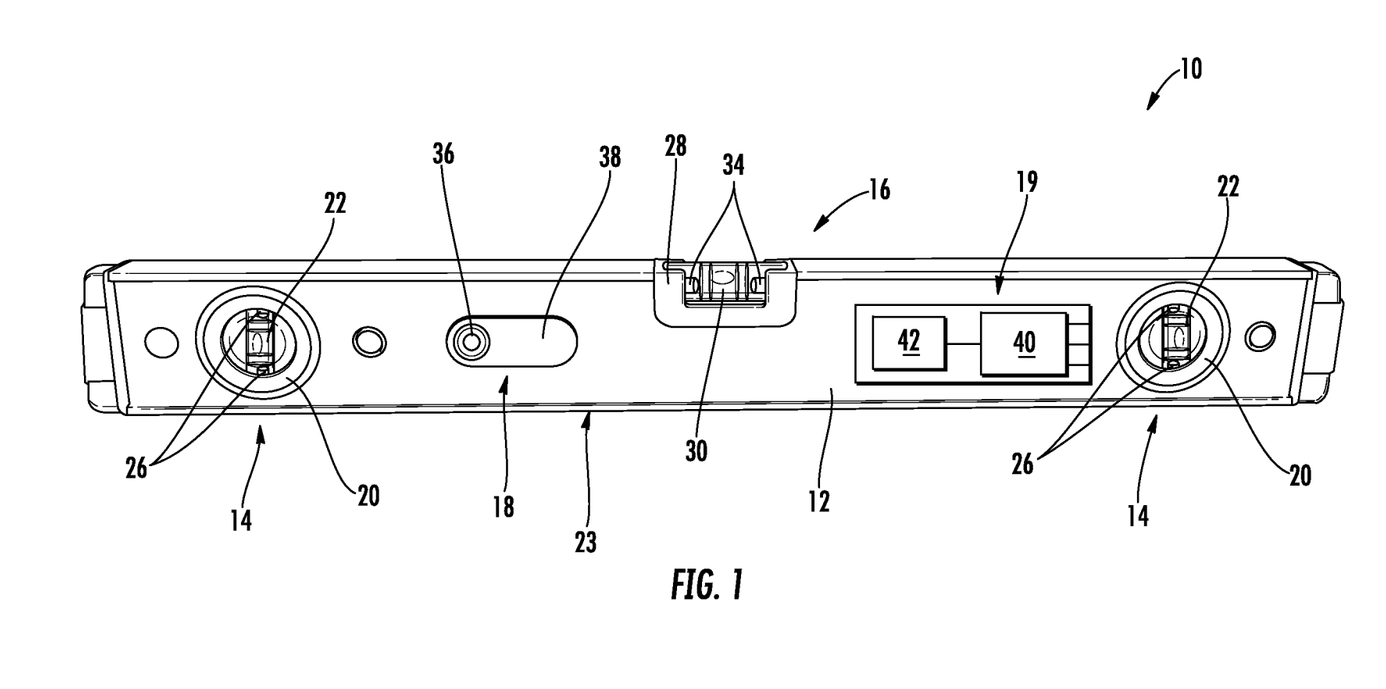
FIG. 1 is a perspective view from one side of a level including audio and/or visual indicators, according to an example embodiment.

Referring to FIG. 1, one embodiment of a level 10 having audio and/or visual indicators is shown. Level 10 includes a level body, shown as housing 12 (e.g. body, frame, structure, etc.). Plumb vial assemblies 14, level vial assembly 16, and audio indicator 18 are set in and are supported by housing 12 and are visible from the exterior of level 10. Internal electronics 19 are set in and are supported by the interior of housing 12 and, in specific embodiments, are not visible from the exterior of level 10.

In one embodiment, plumb vial assemblies 14 each have a vial surround 20, vial 22, and visual plumb indicators 26. Vial surround 20 contains and supports vial 22 within housing 12. Vial 22 is an analog indicator of levelness and is positioned to measure whether level 10 is vertical or plumb. In one embodiment, vial 22 is a spirit vial including a bubble that moves within the vial as the level position changes. Light sources, shown as visual plumb indicators 26, are generally positioned to direct light into vial 22, and in specific embodiments are located to direct light through both opposing end walls of a generally cylindrical shaped vial 22. In this arrangement, visual plumb indicators 26 are positioned to direct light in the direction of the longitudinal axis of vial 22. Various embodiments of level 10 having more or fewer plumb vial assemblies 14 are contemplated. In one embodiment level 10 includes no plumb vial assemblies 14.

In one embodiment, level indicator 16 has a support frame 28, a vial 30, and light sources, shown as visual level indicators 34. Support frame 28 contains and supports vial 30 within housing 12. Vial 30 is an analog indicator of levelness and is positioned to measure whether level 10 is vertical or horizontal. In one embodiment, vial 30 is a spirit vial including a bubble that moves within the vial as the level position changes. Visual level indicators 34 are generally positioned to direct light into vial 30, and in specific embodiments are located to direct light through both opposing end walls of a generally cylindrical shaped vial 30. In this arrangement, visual level indicators 34 are positioned to direct light in the direction of the longitudinal axis of vial 30. Various embodiments of level 10 having multiple level vial assemblies 16 are contemplated. Positioning visual indicators 26 and 34 such that light is directed into both end walls of vials 22 and 30, respectively, provides for bright, high quality illumination of vials 22 and 30.

Visual indicators 26 and visual indicators 34 are configured to illuminate vials 22 and 30 respectively when activated in response to a control signal. In one embodiment, the liquid within vial 22 and vial 30 contains an ultraviolet light activated optical brightener that enhances or increases the brightness of light leaving the illuminated vials 22 and 30. In various embodiments, visual indicators 26 and 34 are configured to generate light having a first color when the associated level vial indicates levelness and to generate light of a second color (different from the first color) when the associated level vial is not indicating levelness.

In one embodiment, visual indicators 26 and visual indicators 34 each include two pairs of light emitting elements, such as light emitting diodes (LEDs). A pair of LEDs is positioned at each end wall of the generally cylindrical vial 22 and vial 30 respectively. The different LEDs in each pair generate a unique and visually distinct color. For example, an LED pair may include one red LED and one green LED. In another embodiment, visual indicators 26 and visual indicators 34 are one single color LED. In other embodiments, visual indicators 26 and 34 may include various numbers of LEDs located outside of each end wall of vials 22 and 30, such as 1 LED, 3 LEDs, 4 LEDs, etc.

In one embodiment, audio indicator 18 includes a speaker 36 and a support frame 38. Support frame 38 contains and supports speaker 36 within housing 12. Audio indicator 18 is configured to produce an audio signal through speaker 36 in response to a control signal. In another embodiment, audio indicator 18 is omitted from level 10.

Figure 2:
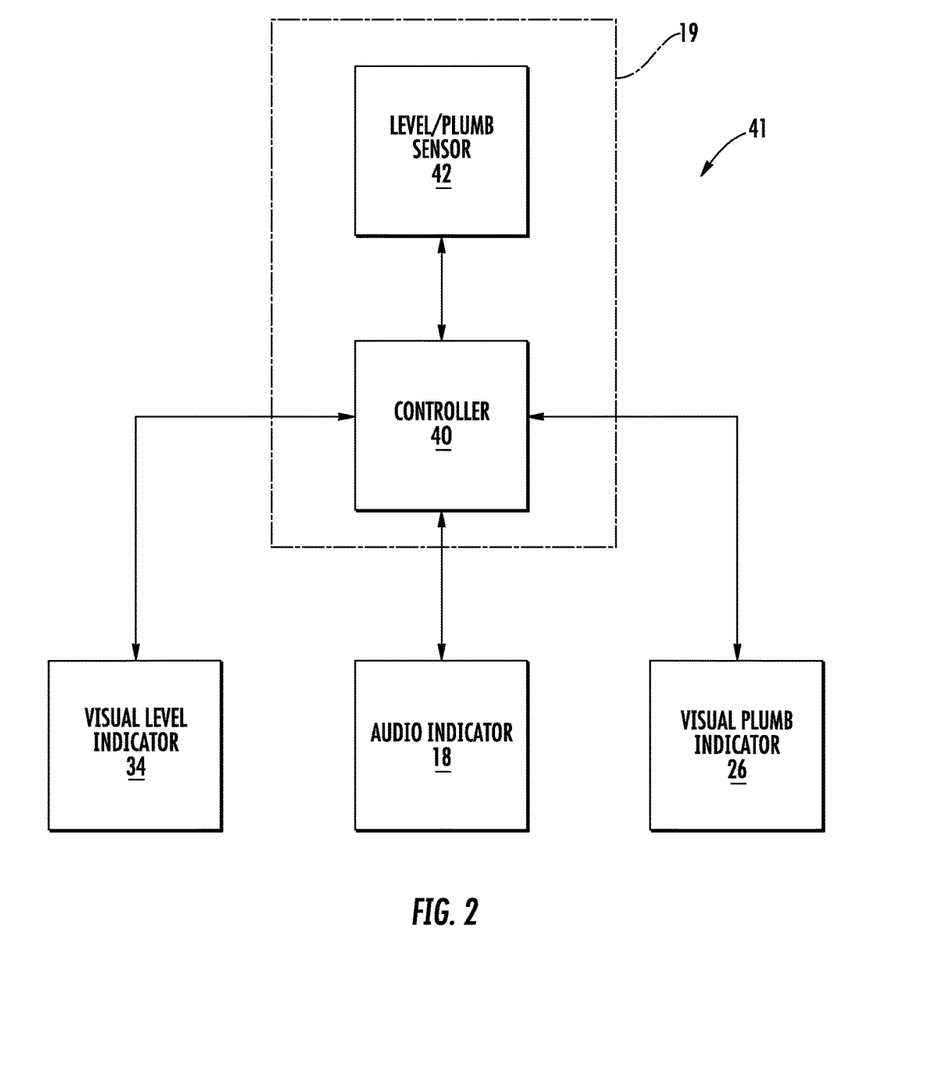
FIG. 2 is a block diagram of an electronic level indication system for a level including audio and/or visual indicators, according to an example embodiment.
Figure 3:
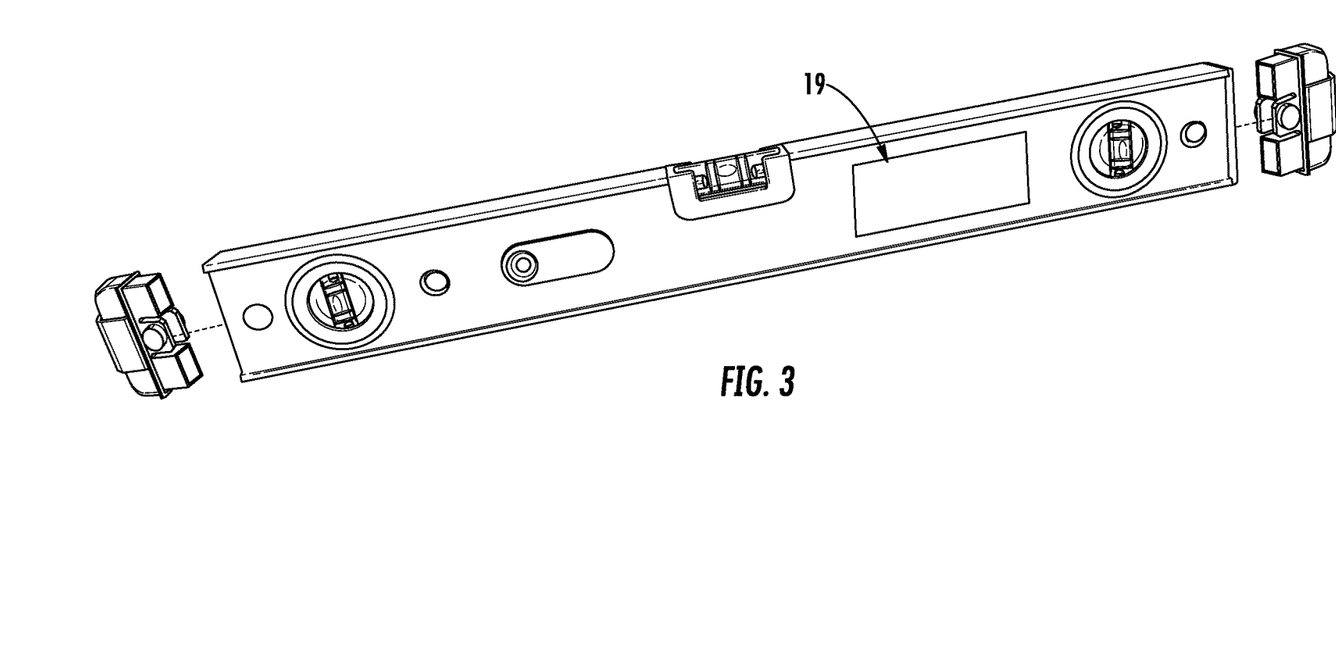
FIG. 3 is a perspective view from one side of a level including audio and/or visual indicators showing details of a lighted level vial and a removable end cap, according to another example embodiment.

Referring now to FIG. 2, a schematic diagram of an electronic level indication system for a level including audio and visual indicators, such as system 41 is shown according to an exemplary embodiment. Internal electronics 19 include a controller 40 and an electronic position sensor, shown as a level/plumb sensor 42. Controller 40 and level/plumb sensor 42 are located inside housing 12. Level/plumb sensor 42 is electrically coupled to controller 40. Controller 40 is electrically coupled to visual plumb indicators 26, visual level indicators 34 and/or audio indicator 18. Internal electronics 19 also include a power supply configured to power controller 40, level/plumb sensor 42, visual plumb indicators 26, visual level indicators 34 and audio indicator 18. In various embodiments, the power supply includes one or more alkaline batteries, one or more rechargeable battery, such as lithium-ion batteries, solar cell, etc.

In one embodiment, level/plumb sensor 42 is an electronic component that detects the position of level 10 along its longitudinal axis relative to 100 percent horizontal (i.e. level) and/or 100 percent vertical (i.e. plumb). For example, sensor 42 generates a levelness signal when a base surface 23 is oriented in the horizontal direction, and when base surface 23 is oriented in the horizontal direction, the bubble of level vial 30 is located in the center of level vial 30. Level/plumb sensor 42 generates a signal representative of the position or orientation of level 10 and sends that signal to controller 40. In one embodiment, level/plumb sensor 42 generates a levelness/plumbness signal when level 10 is within a specific percentage of level or plumb, such as 99 percent. Level/plumb sensor 42 is calibrated to correspond to measurements of analog vials 22 and 30. Specifically, the signal generated by level/plumb sensor 42 will be a level signal when the bubble of vial 30 is level (e.g., the bubble is located in the center of vial 30) and a plumb signal when the bubble of vial 22 is plumb (e.g., the bubble is located in the center of vial 22). In one embodiment, level/plumb sensor 42 is an accelerometer. In another embodiment, multiple level/plumb sensors 42 are used for each different vial of level 10. As will be explained in detail below, one or more aspect of visual indicators and/or speaker 36 are controlled based on upon the levelness/plumbness signal from sensor 42.

In various embodiments, controller 40 is any electronic control device or circuit configured to control the various devices discussed herein. For example, control 40 may include microcontroller, microprocessor, ASIC, computer, FPGA, etc.). Controller 40 receives the signal generated by level/plumb sensor 42 and interprets or parses the signal to determine what if any control signal to generate and send to visual level indicators 34, audio indicator 18, and/or visual plumb indicators 26. In one embodiment, controller 40 is configured to control an aspect of light generated by one of the visual indicators to illuminate the associated level vial in response to the signal received from the electronic position sensor. In one embodiment, controller 40 is configured to control an aspect of sound generated by speaker 36 in response to the signal received from the electronic position sensor. In one embodiment, the aspect of light generated by the light source controlled by controller 40 is at least one of the activation of the light source, the color of light generated by the light source, the intensity of light generated by the light source and a pulse rate of light generated by the light source. In one embodiment, the aspect of sound generated by speaker 36 controlled by controller 40 is at least one of the activation of the speaker, the frequency of sound generated by the speaker, the volume of sound generated by the speaker source and a pulse rate of sound generated by the speaker. In one embodiment, controller 40 controls activation of visual level indicators 34, audio indicator 18, and visual plumb indicators 26 by opening and closing electrical and/or physical switches that selectably allow power to be sent to those components.

In one embodiment, controller 40 generates and sends control signals to visual level indicators 34, audio indicator 18, and/or visual plumb indicators 26 when level 10 is approximately level or plumb. In another embodiment, controller 40 generates and sends control signals to visual level indicators 34, audio indicator 18, and visual plumb indicators 26 continuously with the specific value of the signal determined by the value of the signal received from level/plumb sensor 42.

In various embodiments, visual level indicators 34 and/or visual plumb indicators 26 include a first element generating light having a first color and a second element generating light having a second color different than the first color. In one such embodiments, controller 40, based on the signal received from sensor 42, controls visual level indicators 34 to activate the first element when sensor 42 indicates that base surface 23 is within 99% of levelness and controls visual level indicators 34 to activate the second element when sensor 42 indicates that base surface 23 is not within 99% of levelness. In such embodiments, where visual level indicators 34 and visual plumb indicators 26 are sets of at least two LEDs of different colors, controller 40 is configured to control each color LED separately. Controller 40 uses one color to indicate that vials 22 and 30 are indicating plumb or level, respectively. For example, when each set of LEDs includes at least one red LED and one green LED, controller 40 will receive a level signal from level/plumb sensor 42 when level 10 is horizontal and will generate and send a control signal to activate the green LED for visual level indicators 34 and the red LED for visual plumb indicators 26. When level 10 is vertical, controller 40 will receive a plumb signal from level/plumb sensor 42, and will generate and send a control signal to activate the red LED for visual level indicators 34 and the green LED for visual plumb indicators 26.

In another embodiment, visual level indicators 34 and plumb indicators 26 are single color LEDs. Controller 40 is configured to generate and send a control signal to fully activate the LEDs associated with either visual level indicators 34 or visual plumb indicators 26 based on the signal received from level/plumb sensor 42. For example, controller 40 will activate the LEDs for level indicators 34 when level 10 is approximately horizontal, and will activate the LEDs for plumb indicators 26 when level 10 is approximately vertical. In one such embodiment, controller 40 controls visual level indicators 34 and plumb indicators 26 such that when visual level indicators 34 are on, plumb indicators 26 are off, and when plumb indicators 26 are on, visual level indicators 34 are off.

If level/plumb sensor 42 sends continuous data to controller 40, controller 40 is configured to parse the data to determine when level 10 is 100 percent or nearly 100 percent level or plumb and use that determination to selectively activate the LEDs associated with either visual level indicators 34 or visual plumb indicators 26.

In another embodiment, controller 40 is configured to send control signals that dynamically adjust the LEDs associated with either visual level indicators 34 or visual plumb indicators 26 based on a continuous signal received from sensor 42 that corresponds directly to the current relative position of level 10. In one instance, controller 40 will gradually vary the brightness of the LEDs associated with visual plumb indicators 26 and visual level indicators 34 between 0 to 100 percent bright. In another embodiment, controller 40 is configured to vary the pulse rate of the LEDs associated with visual plumb indicators 26 and visual level indicators 34. In another embodiment, controller 40 varies both the brightness and the pulse rate duration.

For example, controller 40 operates the LEDs associated with visual plumb indicators 26 to be 100 percent bright and constantly on when level 10 is vertical and then dims the LEDs and/or reduces the pulse rate as level 10 is rotated away from vertical towards horizontal. Controller 40 will turn off the LEDs once level 10 passes a set crossover points such as 50 or 75 percent plumb. Controller 40 operates the LEDs associated with visual level indicators 34 in the same way except that it is 100 percent bright and constantly on when level 10 is horizontal and 0 percent bright and off at a set crossover point such as 50 or 75 percent level.

The multi-color LED setup can be operated similarly to the single LED setup with respect to varying LED brightness and pulse rate. Each colored LED for both the visual level indicators 34 and visual plumb indicators 26 are separately controllable by controller 40. This controllability provides additional modes of operation.

In one embodiment, controller 40 is configured to operate one color of LEDs, such as the green LEDs, in the same manner as described above for a system having one color of LED. For example, controller 40 operates the green LED associated with visual plumb indicators 26 to be 100 percent bright and constantly on when level 10 is vertical and then dims the LED and/or reduces the pulse rate as level 10 is rotated away from vertical towards horizontal. Controller 40 will turn off the green LED once level 10 passes a set crossover point such as 50 or 75 percent plumb. Controller 40 operates the green LED associated with visual level indicators 34 in the same way except that it is 100 percent bright and constantly on when level 10 is horizontal and 0 percent bright and off at a set crossover point such as 50 or 75 percent level.

In one embodiment, controller 40 operates the second colored LEDs associated with visual level indicators 34 and visual plumb indicators 26, such as the Red LEDs, to be 100 percent on whenever the green LED associated with the same indicator is off. For example, controller 40 operates the red LED associated with visual plumb indicators 26 to be 100 percent bright and constantly on when level 10 is past the set crossover point (e.g. 50 or 75 percent plumb) for the green LED associated with visual plumb indicators 26. Controller 40 operates the red LED associated with visual level indicators 34 in the same way except that it is 100 percent bright and constantly on when level 10 is past the set crossover point (e.g. 50 or 75 percent level) for the green LED associated with visual level indicators 34.

In another embodiment, controller 40 operates the second colored LEDs associated with visual level indicators 34 and visual plumb indicators 26, such as the red LEDs, to vary the brightness and/or pulse rate during a period when the green LED associated with the same indicator is off. For example, controller 40 operates the red LED associated with visual level indicators 34 to be 100 percent bright and constantly on when level 10 is vertical and then dims the LED and/or reduces the pulse rate as level 10 is rotated away from vertical towards horizontal. Controller 40 will turn off the red LED once level 10 passes a set crossover point such as 50 or 75 percent plumb. Controller 40 operates the red LED associated with visual plumb indicators 26 in the same way except that it is 100 percent bright and constantly on when level 10 is horizontal and 0 percent bright and off at a set crossover point such as 50 or 75 percent level.

In one embodiment, controller 40 dynamically adjusts the multi-colored LEDs as described above by sending an identical control signal simultaneously to the LED of one color associated with the visual level indicators 34 and to the LED of the opposite color associated with visual plumb indicators 26. For example, controller 40 sends an identical control signal to the green LED associated with visual level indicators 34 and to the red LED of visual plumb indicators 26. Controller 40 would also send an identical control signal to the red LED associated with visual level indicators 34 and to the green LED of visual plumb indicators 26.

In another embodiment, controller 40 operates the second colored LEDs associated with visual level indicators 34 and visual plumb indicators 26, such as the red LEDs, to vary the brightness to be opposite the varied brightness of the other LED associated with the same indicator. This embodiment displays a composite color of the two LEDs for the period when both are activated. For example, where the LEDs are red and green, various shades of yellow will be observed when both LEDs associated with the same indicator are activated and being dimmed and brightened opposite each other.

For example, controller 40 operates the green LED associated with visual plumb indicators 26 to be 100 percent bright when level 10 is vertical and then dims the LED as level 10 is rotated away from vertical towards horizontal. Controller 40 will turn off the green LED once level 10 passes a set crossover point such as 50 or 75 percent plumb. Controller 40 simultaneously operates the red LED associated with visual plumb indicators 26 to be 0 percent bright when level 10 is vertical and then brightens the red LED as level 10 is rotated away from vertical towards horizontal. Controller 40 will turn the red LED to 100 percent bright once level 10 passes the same crossover point that controller 40 uses to turn off the green LED. Additionally, controller 40 operates the green and red LEDs associated with visual level indicators 34 in the same way. Except, the green LED is 100 percent bright and the red LED is 0 percent bright when level 10 is horizontal and the green LED is 0 percent bright and the red LED is 100 percent bright at a set crossover point such as 50 or 75 percent level.

In one embodiment, controller 40 is configured to operate audio indicator 18 by sending a digital control signal to audio indicator 18. Audio indicator 18 includes a digital to analog converter which converts the digital control signal into an analog signal that is produced by speaker 36. In another embodiment, controller 40 sends an analog control signal to audio indicator 18 which is then produced by speaker 36. In one embodiment, audio indictor 18 and speaker 36 are a digital speaker configured to produce a specific tone in response to a specific digital control signal sent from controller 40. Various methods of operating audio indicator 18 are contemplated any of which may be combined with the various methods described regarding operation of visual level indicators 34 and visual plumb indicators 26.

In one embodiment, controller 40 sends a control signal to fully activate audio indicator 18 based on the signal received from sensor 42. For example, controller 40 will activate audio indicator 18 when level 10 is approximately horizontal or vertical. If level/plumb sensor 42 sends continuous data to controller 40, controller 40 is configured to parse said data to determine when level 10 is 100 percent or nearly 100 percent level or plumb and use that determination to activate audio indicator 18.

In another embodiment, controller 40 is configured to send control signals that dynamically adjust the tone produced by audio indicator 18 based on a continuous signal received from level/plumb sensor 42 that corresponds directly to the current relative position of level 10. In one instance, controller 40 will gradually vary the volume of the tone between 0 and 100 percent loud. In another embodiment, controller 40 is configured to vary the pulse rate of the tone between no pulses and constantly activated. In another embodiment, controller 40 is configured to vary the pitch of the tone from low to high or high to low.

For example, controller 40 operates audio indicator 18 to produce a tone that is 100 percent loud, high pitched, and/or constantly on when level 10 is vertical and/or horizontal and then lowers the volume, lowers the pitch and/or reduces the pulse rate as level 10 is rotated away from vertical and/or horizontal. Controller 40 will turn off audio indicator 18 to silence the tone once level 10 passes set crossover points such as 50 or 75 percent plumb or level.

In one embodiment, level 10 includes a switch coupled to controller 40. The switch is configured to operate controller 40 between different modes including an off mode. In off mode, controller 40 will not send any control signal to visual level indicators 34, audio indicator 18, and/or visual plumb indicators 26. In one instance, power is disconnected from all the electrical components while level 10 is in off mode. Other selectable modes can include the various methods of operation described above with respect to visual level indicators 34, audio indicator 18, and visual plumb indicators 26. In one embodiment, the switch is mounted in housing 12 and is selectable from the outside of level 10. In another embodiment, the switch is mounted contiguously with controller 40 and is selectable by removing controller 40 from inside housing 12. In another embodiment, level 10 includes a separate switch for the audio and visual indicators for each vial.

It should be understood that additional embodiments of the audio and visual indicators described herein directed to detecting different angle measurements that are not substantial horizontal or vertical (e.g. 45 degrees) are contemplated. Further, the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A leveling tool comprising:
   a level body;
   a level vial supported by the level body;
   a light source supported by the level body and positioned to direct light toward the level vial, the light source comprises a first lighting element supported by the level body and positioned to direct light toward a first end of the level vial in a direction along a longitudinal axis of the level vial;
   an electronic position sensor supported by the level body generating a level signal indicating the orientation of the level body is level and a not-level signal indicating the orientation of the level body is not level; and
   a controller supported by the level body and communicably coupled to the light source and the electronic position sensor, wherein the controller is configured to control an aspect of light generated by the light source to illuminate the level vial in response to at least one of the level and the not-level signals received from the electronic position sensor.

2. The leveling tool of claim 1, wherein the level vial includes a bubble that is positioned in the center of the level vial when a base surface of the level body is horizontally oriented, wherein the electronic position sensor is calibrated such that the electronic position sensor generates the level signal when the bubble is positioned in the center of the level vial, and the controller activates the light source in response to the level signal.

3. The leveling tool of claim 1, wherein the aspect of light generated by the light source controlled by the controller is at least one of the activation of the light source, the color of light generated by the light source, the intensity of light generated by the light source and a pulse rate of light generated by the light source.

4. The leveling tool of claim 1, wherein the first lighting element generates light having a first color and the light source comprises a second lighting element generating light having a second color different than the first color, wherein the controller, based on at least one of the level and the not-level signals received from the electronic position sensor, controls the light source to activate the first lighting element when the electronic position sensor indicates that a base surface of the level body is within 99% of levelness and controls the light source to activate the second lighting element when the electronic position sensor indicates that the base surface of the level body is not within 99% of levelness.

5. The leveling tool of claim 1, wherein the light source comprises second lighting element supported by the level body and positioned to direct light toward a second end of the level vial in a direction along the longitudinal axis of the level vial.

6. The leveling tool of claim 5, wherein the level vial includes liquid and a bubble within the level vial, wherein the liquid includes an ultraviolet light activated optical brightener.

7. The leveling tool of claim 1, further comprising a speaker supported by the level body, wherein the controller is configured to variably control an aspect of sound generated by the speaker in response to at least one of the level and the not-level signals received from the electronic position sensor.

8. A leveling tool comprising:
   a level body;
   a level vial supported by the level body, the level vial including a first end, a second end and a longitudinal axis extending between the first end and the second end;
   an electronic position sensor supported by the level body generating a level signal indicating the orientation of the level body is level and a not-level signal indicating the orientation of the level body is not level;
   a first light source supported by the level body and positioned to direct light toward the first end of the level vial in a direction along the longitudinal axis of the level vial;
   a second light source supported by the level body and positioned to direct light toward the second end of the level vial in a direction along the longitudinal axis of the level vial, wherein the first and second light sources are configured to generate light having a first color when the level vial indicates levelness and to generate light of a second color when the level vial is not indicating levelness; and
   a controller supported by the level body and communicably coupled to the first light source, the second light source and the electronic position sensor, wherein the controller is configured to variably control an aspect of light generated by the first and second light sources to illuminate the level vial in response to at least one of the level and the not-level signals received from the electronic position sensor.

9. The leveling tool of claim 8, wherein the first and second light sources are LED light sources.

10. The leveling tool of claim 9, wherein the first and second light sources are controlled by the controller to generate light of the first color based upon a first signal from the electronic position sensor indicating that a base surface of the level body is within 99% of levelness and to generate light of the second color based upon a second signal from the electronic position sensor indicating that the base surface of the level body is not within 99% of levelness.

11. The leveling tool of claim 8, wherein the level vial is a horizontal level vial oriented such that a longitudinal axis of the horizontal level vial is parallel to a base surface of the level body, and further comprising a second level vial oriented in a vertical direction such that a longitudinal axis of the second level vial is perpendicular to the base surface of the level body.

12. The leveling tool of claim 11, further comprising:
a third light source supported by the level body and positioned to direct light toward a first end of the second level vial in a direction along the longitudinal axis of the second level vial; and
a fourth light source supported by the level body and positioned to direct light toward a second end of the second level vial in a direction along the longitudinal axis of the second level vial.

13. The leveling tool of claim 12, wherein a controller controls the first, second, third and fourth light sources such that when the first and second light sources are on, the third and fourth light sources are off, and when the third and fourth light sources are on, the first and second light sources are off.

14. The leveling tool of claim 8, further comprising a speaker supported by the level body, wherein a controller is configured to variably control an aspect of sound generated by the speaker in response to at least one of the level and the not-level signals received from the electronic position sensor.

15. The leveling tool of claim 8, wherein the level vial includes liquid and a bubble within the level vial, wherein the liquid includes an ultraviolet light activated optical brightener.

16. A leveling tool comprising:
a level body;
a level vial supported by the level body;
a speaker supported by the level body;
an electronic position sensor supported by the level body generating a level signal indicating the orientation of the level body is level and a not-level signal indicating the orientation of the level body is not level;
a controller supported by the level body and communicably coupled to the speaker and the electronic position sensor, wherein the controller is configured to variably control an aspect of sound generated by the speaker in response to at least one of the level and not-level signals received from the electronic position sensor; and
a light source supported by the level body and positioned to direct light toward the level vial along the longitudinal axis of the level vial, wherein the controller is configured to variably control an aspect of light generated by the light source to illuminate the level vial in response to at least one of the level and the not-level signals received from the electronic position sensor.

17. The leveling tool of claim 16, wherein the level vial includes a bubble that is positioned in the center of the level vial when a base surface of the level body is horizontally oriented, wherein the electronic position sensor is calibrated such that the electronic position sensor generates the level signal when the bubble is positioned in the center of the level vial, and the controller activates the speaker in response to the level signal.

18. The leveling tool of claim 16, wherein the aspect of sound generated by the speaker controlled by the controller is at least one of the activation of the speaker, the frequency of sound generated by the speaker, the volume of sound generated by the speaker source and a pulse rate of sound generated by the speaker.

19. The level of claim 16, wherein the aspect of sound generated by the speaker controlled by the controller is the pulse rate of sound generated by the speaker.

* * * * *